United States Patent
Mailfert et al.

(10) Patent No.: US 10,061,209 B2
(45) Date of Patent: Aug. 28, 2018

(54) METHOD FOR VERIFYING A PATTERN OF FEATURES PRINTED BY A LITHOGRAPHY PROCESS

(71) Applicants: IMEC VZW, Leuven (BE); Katholieke Universiteit Leuven, KU LEUVEN R&D, Leuven (BE)

(72) Inventors: Julien Mailfert, Leuven (BE); Philippe Leray, La Hulpe (BE); Sandip Halder, Bierbeek (BE)

(73) Assignees: IMEC VZW, Leuven (BE); Katholieke Universiteit Leuven, KU LEUVEN R&D, Leuven (BE)

( * ) Notice: Subject to any disclaimer, the term of this patent is extended or adjusted under 35 U.S.C. 154(b) by 80 days.

(21) Appl. No.: 15/149,905

(22) Filed: May 9, 2016

(65) Prior Publication Data

US 2017/0052452 A1    Feb. 23, 2017

(30) Foreign Application Priority Data

Aug. 17, 2015  (EP) .................................... 15181276

(51) Int. Cl.
*G06F 17/50* (2006.01)
*G03F 7/20* (2006.01)
(Continued)

(52) U.S. Cl.
CPC .............. *G03F 7/705* (2013.01); *G03F 1/36* (2013.01); *G03F 1/70* (2013.01); *G03F 7/70* (2013.01);
(Continued)

(58) Field of Classification Search
CPC ... G03F 1/36; G03F 7/705; G03F 1/70; G03F 7/70; G06F 17/5081; G06F 2217/12;
(Continued)

(56) References Cited

U.S. PATENT DOCUMENTS

| 7,369,697 B2 | 5/2008 | Starikov |
| 2005/0025351 A1 | 2/2005 | Kotani et al. |

(Continued)

FOREIGN PATENT DOCUMENTS

| EP | 2 153 376 A2 | 2/2010 |
| WO | 2014/061575 A1 | 4/2014 |
| WO | 2014/208202 A1 | 12/2014 |

OTHER PUBLICATIONS

European Search Report, European Patent Application No. 15181276.5, dated Mar. 4, 2016.
(Continued)

*Primary Examiner* — Vuthe Siek
(74) *Attorney, Agent, or Firm* — McDonnell Boehnen Hulbert & Berghoff LLP

(57) ABSTRACT

The disclosure relates to a method for verifying a printed pattern. In an example embodiment, the method includes defining sectors of at least a portion of the features in the reference pattern, determining a contour of the printed pattern, and superimposing the contour of the printed pattern on the reference pattern. The method also includes determining surface areas of sectors of the printed pattern that correspond to the sectors of the reference pattern and calculating one or more parameters as a function of at least one of the surface areas, the parameters being related to a single sector or to multiple sectors. The method additionally includes evaluating the parameters with respect to a reference value.

14 Claims, 12 Drawing Sheets

(51) Int. Cl.
  *G03F 1/70*  (2012.01)
  *G06T 7/00*  (2017.01)
  *G03F 1/36*  (2012.01)

(52) U.S. Cl.
  CPC .......... *G06F 17/5081* (2013.01); *G06T 7/001* (2013.01); *G06F 2217/12* (2013.01); *G06T 2207/10061* (2013.01); *G06T 2207/30148* (2013.01)

(58) Field of Classification Search
  CPC . G06T 2207/10061; G06T 2207/30148; G06T 7/001
  See application file for complete search history.

(56) References Cited

U.S. PATENT DOCUMENTS

| | | |
|---|---|---|
| 2009/0202139 A1 | 8/2009 | Toyoda et al. |
| 2009/0218491 A1 | 9/2009 | Morokuma et al. |
| 2014/0101624 A1* | 4/2014 | Wu .......................... G03F 7/00 716/53 |
| 2016/0070847 A1* | 3/2016 | Taguchi .................. G03F 1/36 716/53 |

OTHER PUBLICATIONS

Al-Imam, Mohamed et al., "Optimization of Process Window Simulations for Litho Friendly Design Frame Work", Proc. of SPIE, vol. 6349, 2006, pp. 63491C-1-63491C-10.

* cited by examiner

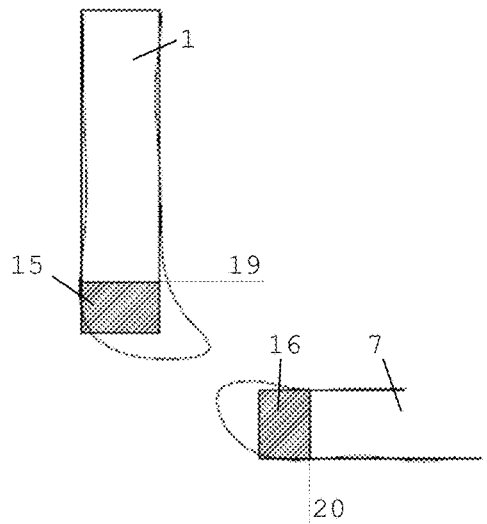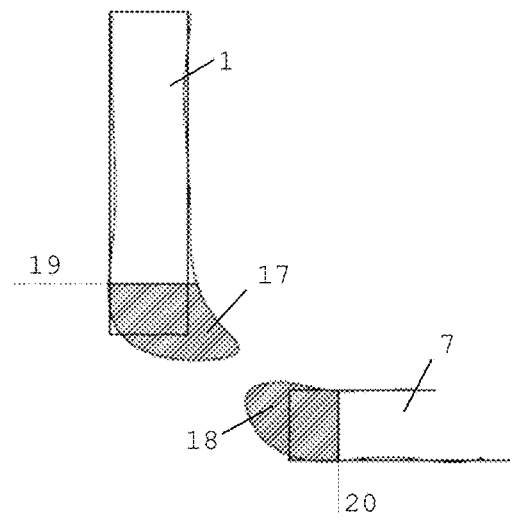
FIG. 5a  FIG. 5b
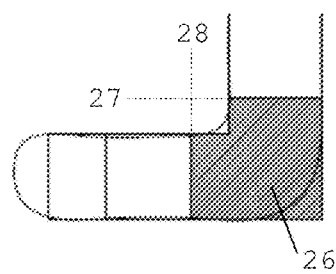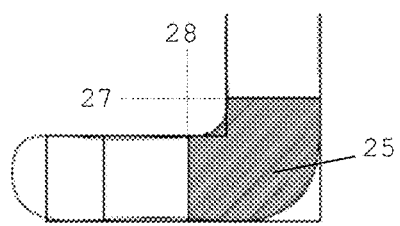
FIG. 6a  FIG. 6b

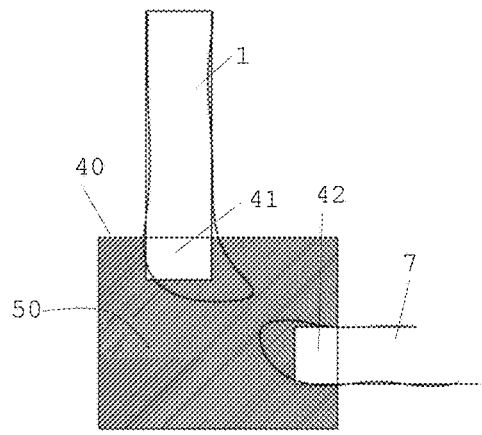
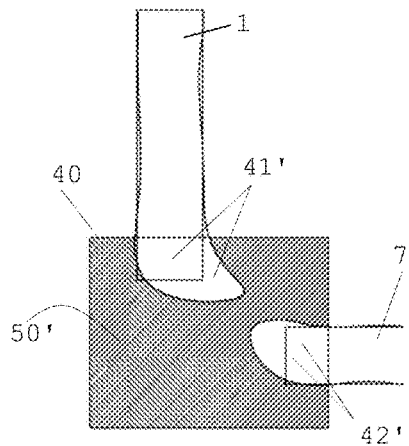
FIG. 9a  FIG. 9b
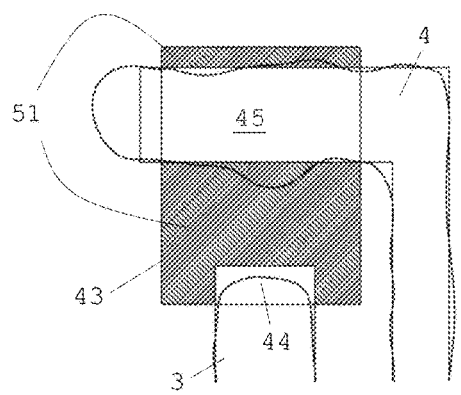
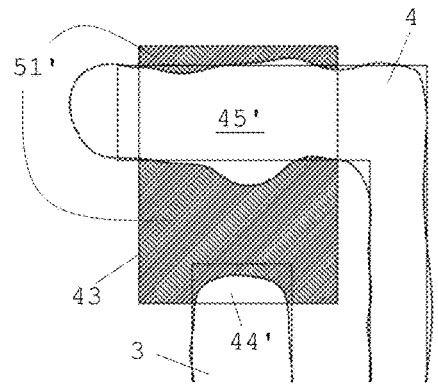
FIG. 10a  FIG. 10b
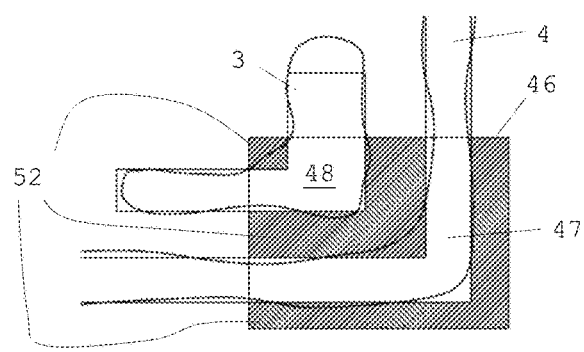
FIG. 11a
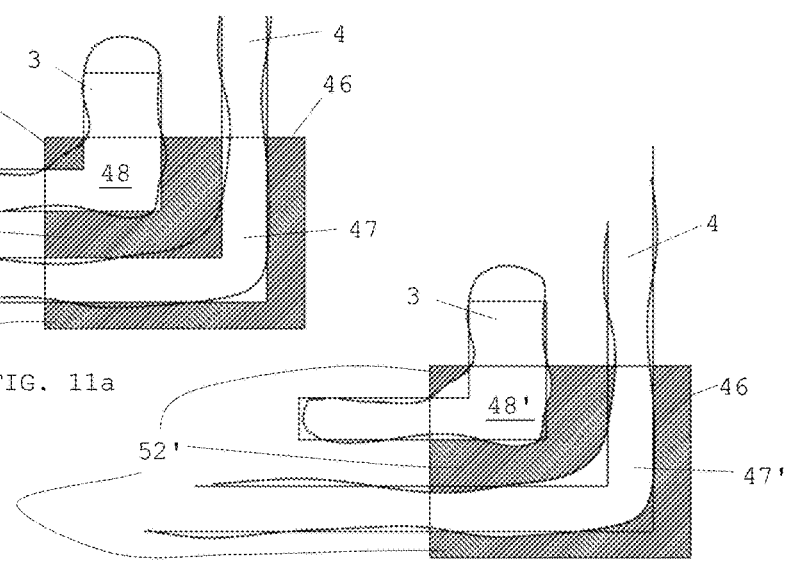
FIG. 11b

METHOD FOR VERIFYING A PATTERN OF FEATURES PRINTED BY A LITHOGRAPHY PROCESS

CROSS-REFERENCE TO RELATED APPLICATIONS

The present application is a non-provisional patent application claiming priority to European Patent Application No. EP 15181276.5, filed Aug. 17, 2015, the contents of which are hereby incorporated by reference.

FIELD OF THE DISCLOSURE

The present disclosure is related to the design and verification of lithographic masks used for the production of semiconductor devices.

BACKGROUND

A semiconductor device such as an integrated circuit chip is produced by a sequence of hundreds of process steps. Many such process steps require a lithographic mask through which a pattern is imprinted on a photoresist layer. The design of lithographic masks nowadays involves the prediction of the printed pattern taking into account optical, resist and etch phenomena, which occur at the scale of the mask features and below. These effects cause unavoidable deviations on the printed pattern with respect to the design intent. So-called 'Electronic Design Automation' (EDA) tools, such as 'Optical Proximity Correction' (OPC) software is used for determining and making corrections to the intended initial mask design to give the best possible approximation of the design intent on the printed wafer. OPC optimization is based on the fragmentation of the initial design edges to compensate for the given phenomena, and relies on an accurate modelling to predict simulated contours of the printed features. In some embodiments, the OPC-based tools may provide a simulated 'process window' (PW) of many features. A PW defines the printability performance limits in terms of the focus and dose settings of a lithographic printing tool, within which limits a reliable print of the pattern is obtainable. Some patterns can have bigger PW than other patterns, due to various reasons such as design geometry, accuracy of the OPC modelling, and more.

Primarily for the features showing the smallest PW, the simulated PW are subsequently verified experimentally by manufacturing the mask and using it to print the pattern on a plurality of die areas of a photosensitive resist layer. Each die area is being printed with varying values of the focus and dose conditions. The experimental PW are determined by measuring features on the plurality of die areas. Differences between the experimental and simulated PW are evaluated and may necessitate further OPC-based optimization of the mask design.

Different measurement techniques are known for analyzing the printed dies. CD-SEM (Critical Dimension-Scanning Electron Microscope) is used to measure the Critical Dimension (CD) of a number of pattern features on the printed dies. Because of the characteristics of the measurement technique, only specific feature types can be measured, such as regular line/space widths and distances between opposite line-ends. This means that the features that are most critical, according to the OPC model, and presenting the most complex geometry can often not be measured. This is particularly true considering logic structures, which have complex 2D geometries and are not regularly distributed. The PW obtained in this way does not necessarily analyze the most likely positions to fail (near corners, specific line-ends, etc.).

Verification of printed patterns on the basis of extracted contours is also known as such, as illustrated for example in WO2014208202. As will be explained in more detail on the basis of a specific example, many parameters obtained from contours do not accurately reflect specific shapes of the printed features. Also, when such contour-based parameters are determined as a function of focus and dose, it is often seen that when fitting the values with a best fitting polynomial, the measured values deviate from the best fitting polynomial in an important way. These drawbacks make it difficult to obtain a reliable Process Window estimation.

As the dimensions of printed features decrease with the evolution towards sub 32 nm nodes in semiconductor processing, the criticality of the above-described design and inspection processes becomes ever greater.

SUMMARY

The disclosure relates to a method that answers to the above-described needs and deficiencies. The method is disclosed herein and in the appended claims. More specifically, the disclosure relates to a method for verifying a printed pattern of features printed through a lithographic mask, the printed pattern approximating a reference pattern, the method comprising:

defining sectors of at least a portion of the features in the reference pattern, determining a contour of the printed pattern, superimposing the contour of the printed pattern on the reference pattern, determining the surface areas of the sectors of the printed pattern that correspond to the sectors of the reference pattern, calculating one or more parameters as a function of the surface area, the parameters being related to a single sector or to multiple sectors, evaluating the parameters with respect to a reference value.

The reference pattern may be a design intent pattern used for designing the lithographic mask. The reference pattern may be a contour of a simulated pattern.

According to an embodiment, one of the parameters is the ratio of the surface area of a sector of the printed pattern to the surface area of the corresponding sector of the reference pattern.

According to an embodiment, the reference pattern comprises one or more line-shaped features, and wherein the line-shaped features are subdivided into sectors by defining line-end sectors, corner sectors and line sectors.

According to an embodiment, the line-shaped features are designed for producing a pattern of metal lines in a level of an integrated circuit, with via connections above and/or below the pattern, the via connections overlapping a line-end, a line or a corner of the pattern, and wherein the definition of at least some of the line-end sectors, line sectors and corner sectors takes into account the dimensions and position of via connections overlapping the sectors, as well as an overlay error between the line pattern and the via connections.

According to an embodiment, the length L of a line-end sector is defined by the following condition:

$$L \geq D_e + A + OVL,$$

wherein $D_e$ is the distance between the distal end of the line end sector and an overlapping via connection, A is the dimension of the via in the longitudinal direction of the line end sector and OVL is the maximum overlay error in the longitudinal direction of the line end sector.

According to an embodiment the length L of a line sector is defined by the following condition:

$$L \geq A + 2 \cdot OVL$$

wherein A is the dimension of an overlapping via in the longitudinal direction of the line sector and OVL is the maximum overlay error in the longitudinal direction of the line sector.

According to an embodiment, the dimensions $L_x$ and $L_y$ of a corner sector in two orthogonal directions are defined by the following conditions:

$$L_x \geq D_{ex} + A_x + OVL_x$$

$$L_y \geq D_{ey} + A_y + OVL_y$$

wherein $D_{ex}$ and $D_{ey}$ are the distances between an overlapping via connection and the edges of the corner sector in the two orthogonal directions, $A_x$ and $A_y$ are the dimensions of the via connection in the two orthogonal directions and $OVL_x$ and $OVL_y$ are the maximum overlay errors in the two orthogonal directions.

According to an embodiment, the sectors of the reference pattern and the corresponding sectors of the printed pattern are defined by defining one or more regions comprising two or more neighbouring sectors of features in the reference pattern and of the corresponding features in the printed pattern, and wherein for each of the defined regions the steps are performed of:
  determining the surface area R of the region,
  determining R−R', with R' the total surface area of the two or more neighbouring sectors of the printed pattern,
  determining R−R" with R" the total surface area of the two or more neighbouring sectors of the reference pattern,
  calculating the ratio (R−R')/(R−R") as one of the parameters.

According to an embodiment, the one or more parameters are determined on a plurality of versions of the printed pattern, the versions being printed in a lithographic tool wherein the focus and/or dose is varied in the plurality of versions, and one or more process windows are determined from the values of the parameters.

The disclosure further relates to a method for designing a lithographic mask, comprising:
  providing an intended pattern comprising a plurality of structural features,
  producing a mask design of a lithographic mask suitable for printing the intended pattern, and one or more simulated patterns printed through the mask design,
  producing a lithographic mask according to the mask design,
  printing a pattern through the lithographic mask,
  performing a verification of the printed pattern,
  wherein the verification step is performed according to the previously described method for verifying a printed pattern, with the intended pattern or one of the simulated patterns serving as the reference pattern.

According to an embodiment of the method described in the previous paragraph,
  the verification step is followed by a step of updating the mask design on the basis of the verification,
  a second lithographic mask is produced according to the updated mask design,
  a pattern is printed through the second mask,
  the verification step is performed a second time on the pattern printed through the second mask,
  and the preceding steps are repeated until a lithographic mask is produced that answers to a pre-defined set of requirements in terms of the difference between the printed pattern and a reference pattern.

The step of producing a mask design suitable for printing the intended pattern and producing one or more simulations of the printed pattern may be performed by using a software tool for optical proximity correction.

According to an embodiment, the step of determining, on the contours obtained from the printed pattern, the value of one or more of the parameters and comparing the values to a reference value, is performed by using the OPC software tool for verifying the contours.

BRIEF DESCRIPTION OF THE FIGURES

In FIGS. 3b and 3c, the EPE data are biased by the same offset value to avoid any negative values for plotting reasons.

FIGS. 5a and 5b illustrate parameters suitable for evaluating the print of a line-end sector, according to an example embodiment.

FIGS. 6a and 6b illustrate further parameters, suitable for evaluating the print of a corner sector, according to an example embodiment.

FIGS. 9a, 9b, 10a, 10b, 11a, and 11b illustrate parameters suitable for evaluating the print of two neighbouring sectors of pattern features, according to example embodiments.

DETAILED DESCRIPTION

Figure 1:
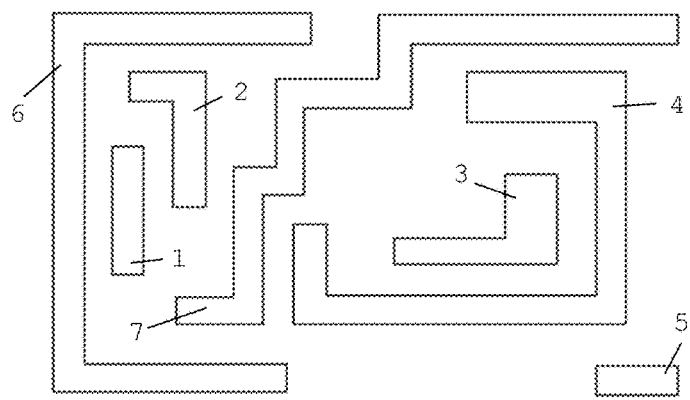
FIG. 1 illustrates an example of a pattern of features having complex 2D polygon shapes.

The disclosed method is explained in more detail on the basis of the following description and accompanying drawings. In the present context, a 'pattern' or 'pattern of features' is defined as a 2-dimensional image of a printed pattern of features, the features appearing as 2-dimensional shapes in the plane of the image. FIG. 1 shows an example of a pattern of line-shaped features 1 through 7 that needs to be printed by lithography, by exposing a resist layer through a lithographic mask, developing the resist and optionally removing the resist from the exposed or non-exposed areas, depending on the type of resist that is used. This may yield a resist layer with trenches formed in the shape of the pattern, or lines in the form of the pattern. A lithographic mask comprising this pattern may be used for example to produce metal lines formed according to the pattern, in a metallization layer produced in the back-end-of-line part of an IC fabrication process sequence.

FIG. 1 shows the so-called 'design intent' of a line pattern, i.e. the theoretical shape of a number of line-shaped features (as seen in the plane of the figure). In the present context and defined in a design intent pattern, line-shaped features, or 'line features' as referred to hereafter, are elongated polygon-shaped features oriented along one or more directions, such as along two orthogonal directions. The actually printed features (for example trenches in a resist layer) approximate the design intent as much as possible, but deviations are unavoidable, as illustrated in the details of the pattern shown in FIG. 2, which shows the contour of the printed pattern superimposed on the design intent. Such contours may be extracted from a CD-SEM image of the printed pattern by dedicated software tools known in the art today, for example the DesignGauge® metrology system from Hitachi High Technology Corporation.

Figure 2:
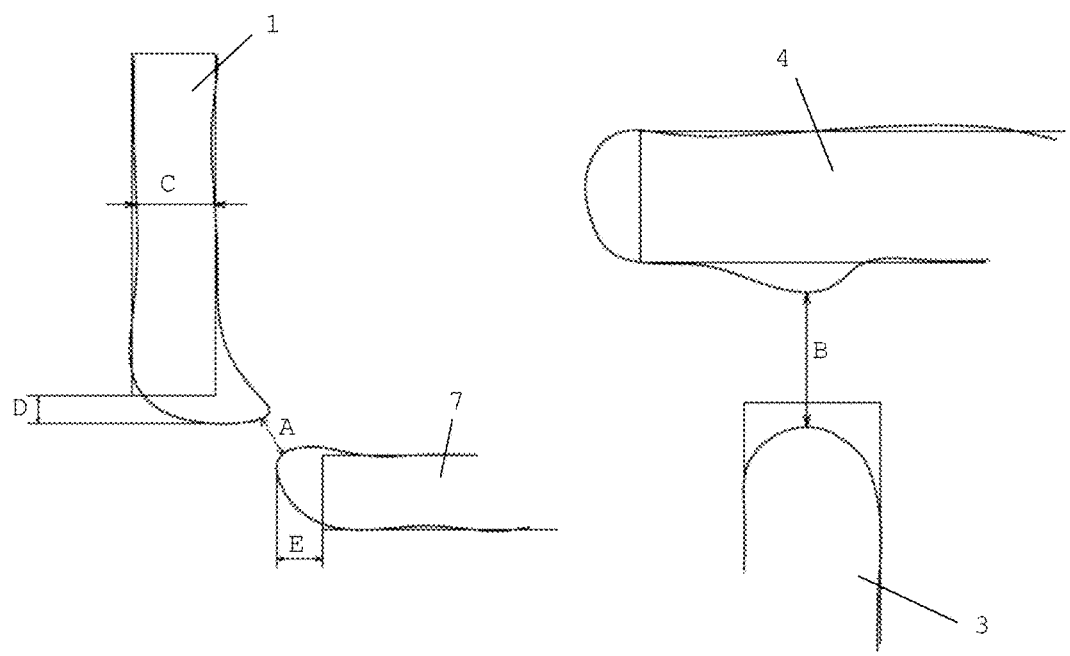
FIG. 2 illustrates a number of parameters determined in conventional methods, on the basis of a contour of the printed pattern.

FIG. 2 further illustrates a number of typical contour-based parameters on which a process window characterization can be based: the distance A between the opposite line-ends of features 1 and 7, the distance B between the line-end of feature 3 and the side of feature 4, the width C of feature 1, and the distances D and E between the printed line-ends of features 1 and 7 on the one hand and the design intent of these features 1 and 7 on the other. A, B and C are examples of what is called a 'critical dimension' (CD). D and E are examples of line-end 'edge placement errors' (EPE). These CD or EPE type parameters are known in the art today for determining the process window, by measuring these parameters on a plurality of dies printed on a focus-modulated and/or dose-modulated (i.e. focus-exposure matrix) test wafer, i.e. by changing the focus and/or dose condition of the lithographic tool for each die of the wafer.

Figure 3A:
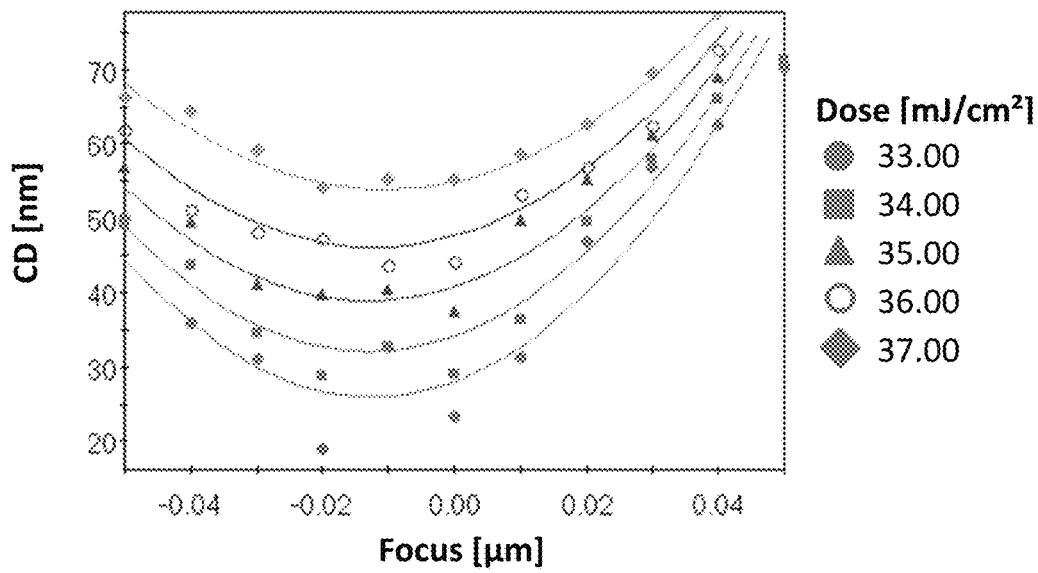
FIGS. 3a, 3b, and 3c illustrate Bossung plots of the parameters illustrated in FIG. 2.
Figure 3B:
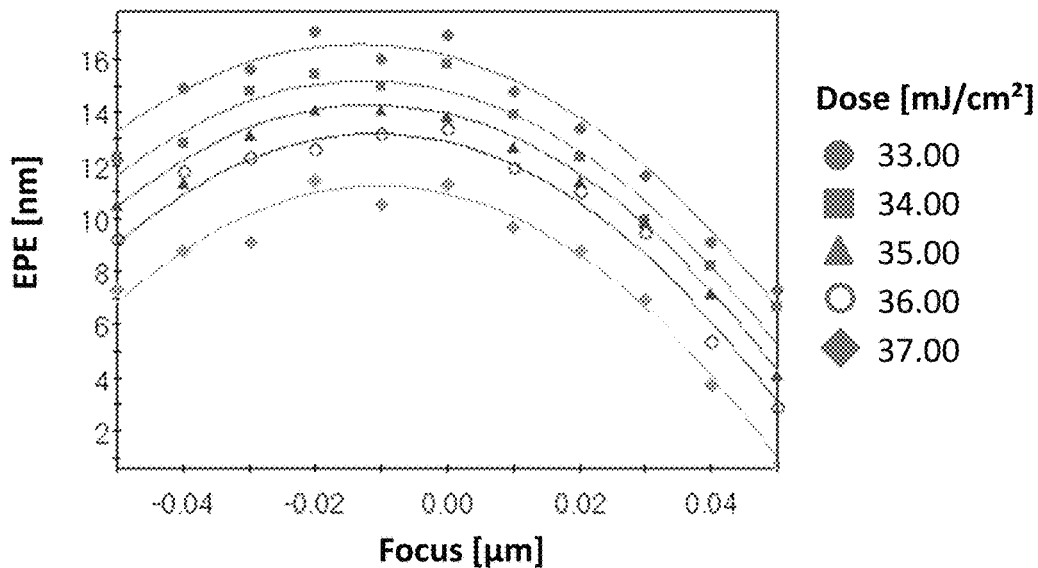
Figure 3C:
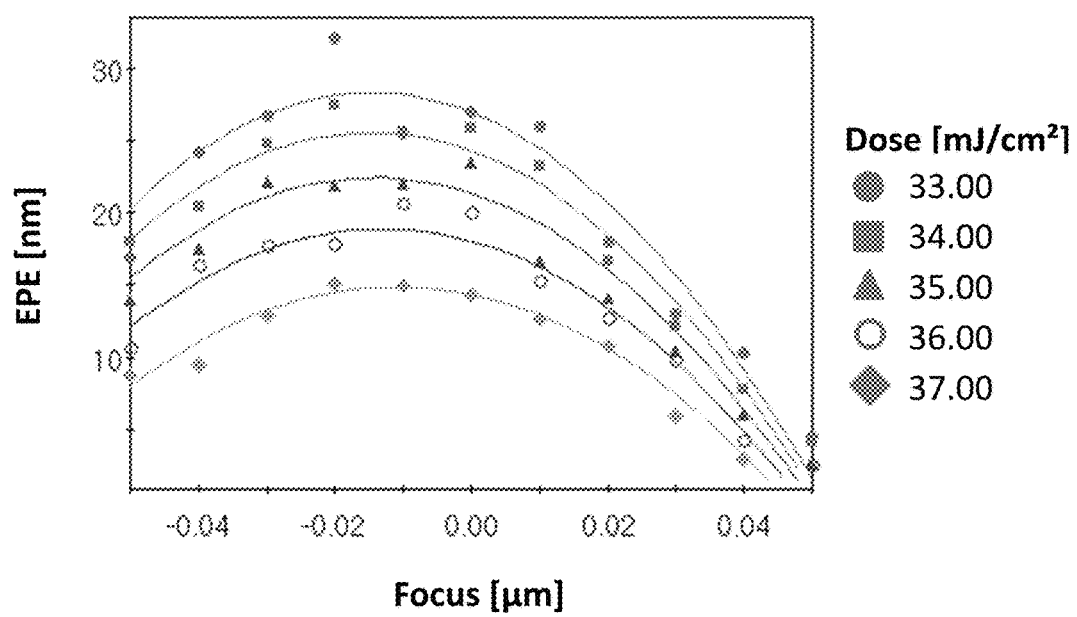

As seen in FIG. 2 however, the CD and EPE parameters are often inadequate in determining whether or not a print is acceptable. For example, the EPE determined on a line-end that is deformed in the manner shown in FIG. 2 fails to detect such a deformation: distance D in particular would be regarded as small, whereas the sideways deformation of this line-end goes undetected. Likewise, the distance B is measured to be close to the design intent, whereas the protrusion on the sidewall of feature 4 remains undetected. These failures to adequately characterize the way in which features are printed often leads to errors in the process window, for example resulting in a process window that is too optimistic, i.e. focus and dose conditions are allowed which are in fact the cause of badly printed features. Also, when looking at Bossung plots of parameters A, D and E, shown in FIGS. 3a to 3c respectively, it is clear that the polynomial fit of the critical dimensions determined for various dose levels is not accurately approximated (as seen by the large difference between many of the data points and the curves). This leads to an unreliable process window characterization.

The present disclosure is related to a method for verifying a printed pattern of features, which may include polygon-shaped features as described above, wherein a number of sub-parts of features of the pattern are first defined, and wherein the surface area of these sub-parts is used for calculating one or more parameters that express the print quality of the features, the parameters being suitable for determining a process window in the manner described above. The surface area of the sub-parts is determined on a contour of the printed pattern, such a contour being obtainable from a CD-SEM image of the printed pattern, equally in the manner described above, by applying a contour extraction tool known in the art. According to example embodiments, the parameters are ratios of surface area-based values divided by reference surface area values. The reference values may be determined on the basis of the design intent of a pattern or on the basis of a contour extracted from a simulated print of the pattern. Defining the sub-parts will hereafter be referred to as 'the sectorization' of the features. Sectorization can take place according to a variation of schemes.

Figure 4:
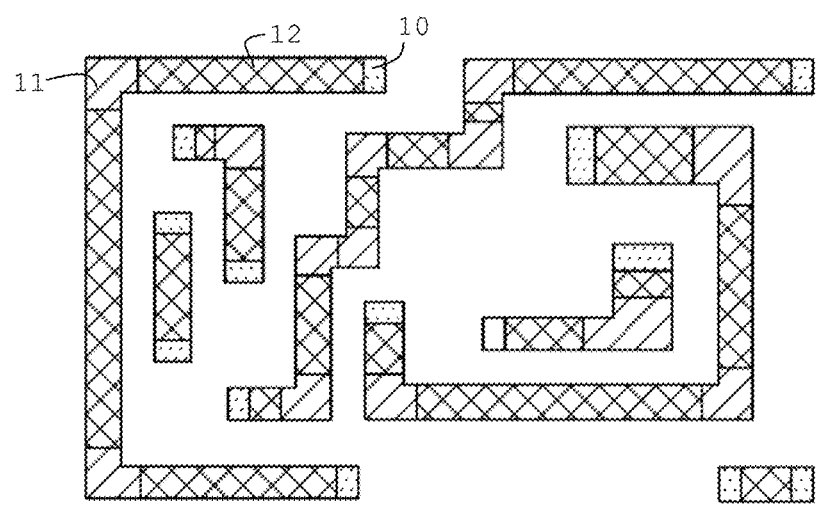
FIG. 4 illustrates sectorization of the pattern of FIG. 1, according to an example embodiment.

A first embodiment is illustrated in FIG. 4 for the design intent of the pattern of line-shaped features 1 through 7 illustrated earlier. The surface areas of the features of this pattern are subdivided into sectors wherein three types of sectors are defined, indicated by three types of hatching in the drawing in FIG. 4: line-end sectors 10, corner sectors 11 and line sectors 12. In this embodiment, the sectors are thus defined by subdividing the features of the design intent. The size of the sectors can be chosen manually or may be determined automatically, based for example on the dimensions of the features. For defining the surface area-based parameters on the printed pattern, a contour of this pattern is superimposed on the design intent. Alignment techniques as known in the art are used to obtain optimal correspondence of the contour to the design intent. A first parameter that may be obtained from this sectorization is referred to as the Line-end area Contour Ratio (LECR) and defined as the ratio of the surface area of a line-end sector of a printed pattern to the corresponding line-end sector reference area. In this example, the reference area is defined as the area of the line-end sector 10 of the design intent pattern. As stated above, the reference may also be chosen to be a contour of a simulated pattern, as will be explained later in more detail.

FIGS. 5a and 5b show the superposition of the design intent and the contour of the printed pattern of the region comprising the line-ends of features 1 and 7. FIG. 5a illustrates the reference line-end sectors 15 and 16 of the line-ends of features 1 and 7. FIG. 5b illustrates the line-end sectors 17 and 18 of the contour of the printed pattern. The line-end sectors 17/18 of the printed pattern are delimited by the same boundaries 19/20 as the defined sectors of the design intent. These boundaries are thus the basis for defining the sectors of the printed pattern that correspond to the sectors of the intended pattern. The surface area of these printed line-end sectors can be calculated from the contour by known image processing techniques.

The LECR for these two line-ends 1 and 7 are calculated as:

$$LECR_1 = area\ 17/area\ 15$$

$$LECR_7 = area\ 18/area\ 16$$

The LECR parameter is a measure for the print quality of line-ends in a pattern. The closer the LECR is to the value 1, the better the print quality. LECR smaller than 1 indicates a line-end pull-back error, LECR higher than 1 indicates line-end push-out (as illustrated in FIG. 5). Contrary to the line-end parameters illustrated in FIG. 2, the LECR parameter is a better measure for the print quality when a sideways push-out takes place. A high degree of push-out of a line-end will result in high LECR, regardless whether the push-out is straight or sideways. As a result, the LECR also allows a more accurate Process Window characterization as will be explained further in this description. The LECR parameter is also statistically stronger than EPE, as it takes into account the deviation from the design intent or another reference, of a larger number of measurement points on the contour compared to the EPE parameter, the latter only taking into account the deviation of a single point. In fact, every point on the contour of the printed sector is taken into account when calculating the LECR. This improved statistic capability is valid not only for the LECR, but for any sector-area based parameter according to the present disclosure.

A second parameter obtainable from the sectorization shown in FIG. 4 is referred to as the Corner area Contour Ratio (CCR). This is illustrated in FIGS. 6a and 6b. The corner sector of the printed pattern (hatched area 25 in FIG. 6b) is defined between the same boundaries 27 and 28 as the corner sector of the design intent (hatched area 26 in FIG. 6a).

The CCR parameter is thus defined as:

CCR=hatched area 25/hatched area 26

The CCR is a useful parameter for assessing the printability of corners in a pattern, in particular the corner rounding. This cannot be done on the basis of standard CD measurements.

Figure 7A:
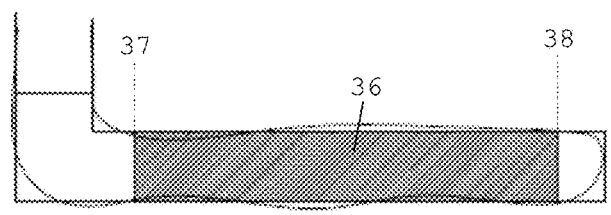
FIGS. 7a and 7b illustrate further parameters, suitable for evaluating the print of a line sector, according to an example embodiment.
Figure 7B:
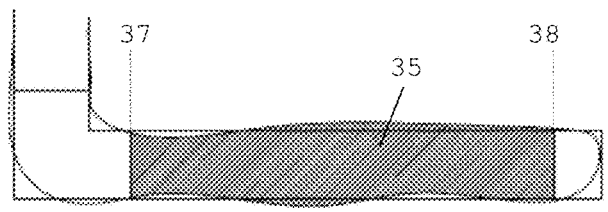

A third parameter obtainable from the sectorization shown in FIG. 4 is referred to as the Line area Contour Ratio (LCR). This is illustrated in FIG. 7a/7b. The line sector of the printed pattern (hatched area 35 in FIG. 7b) is defined between the same boundaries 37 and 38 as the line sector of the design intent (hatched area 36 in FIG. 7a).

The LCR parameter is thus defined as:

LCR=hatched area 35/hatched area 36.

Figure 8:
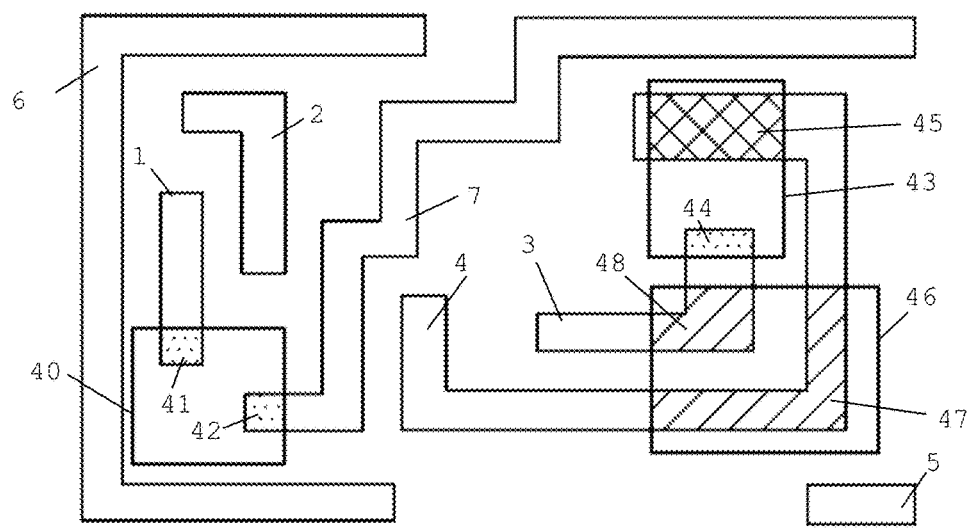
FIG. 8 shows a further way to define sectors in the pattern of FIG. 1, according to an example embodiment.

An alternative way of sectorizing the pattern of FIG. 1 is illustrated in FIG. 8. This sectorization is aimed at obtaining parameters that express the print quality of a plurality of neighbouring sectors of neighbouring printed features. As shown in FIG. 8, polygon shaped regions are defined, such as the rectangles as shown in the figure, around neighbouring sectors of two adjacent features. Rectangle 40 is drawn around the line-end sectors 41/42 of features 1 and 7. Rectangle 43 is drawn around one line-end sector 44 of feature 3 and a line sector 45 of feature 4. Rectangle 46 is drawn around two parallel corner sectors 47/48 of features 4 and 3 respectively. The sectors are thus defined by drawing the rectangles 40/43/46. Once again, the sectorization is based on the design intent in this embodiment. As is clear from the drawings, the polygon is drawn around neighbouring sectors of two different features.

The parameter derived from this type of sectorization is referred to as the Space area Contour Ratio (SCR). For the two neighbouring line-ends of features 1 and 7, the way in which the SCR is defined is illustrated in FIGS. 9a and 9b. The hatched area 50 is the surface area of the rectangle 40 minus the area of the design intent line-end sectors 41/42. FIG. 9b shows the same rectangle 40. The hatched area 50' is the area of rectangle 40 minus the area of the printed line-end sectors 41' and 42'.

The SCR is defined as:

SCR=hatched area 50'/hatched area 50

FIGS. 10 and 11 illustrate the SCRs obtained from rectangles 43 and 46. The SCR obtained from rectangle 43 is the ratio of the hatched area 51' to hatched area 51. The SCR obtained from rectangle 46 is the ratio of the hatched area 52' to hatched area 52. In each case, the SCR is obtained by superimposing a printed pattern onto a reference pattern defining one or more regions (e.g. rectangles 40/43/46) comprising two or more neighbouring sectors of different features in the printed pattern and in the reference pattern,
for each of the defined regions:
determining the surface area R of the region,
determining R−R', with R' the total surface area of the two or more sectors of the printed pattern,
determining R−R" with R" the total surface area of the two or more sectors of the reference pattern,
calculating the SCR as the ratio (R−R')/(R−R")

The SCR gives a better indication than existing CD or EPE based parameters, of the print quality of a feature with respect to another feature. The SCR is also statistically stronger than existing parameters.

Figure 12A:
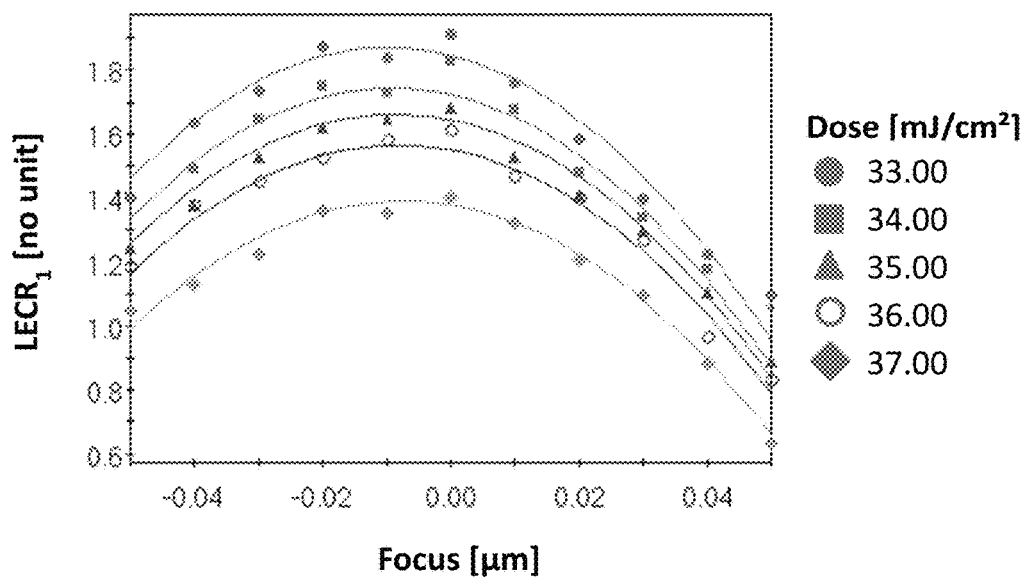
FIGS. 12a, 12b, and 12c illustrate Bossung plots of the parameters illustrated in FIGS. 5 and 9, according to an example embodiment.
Figure 12B:
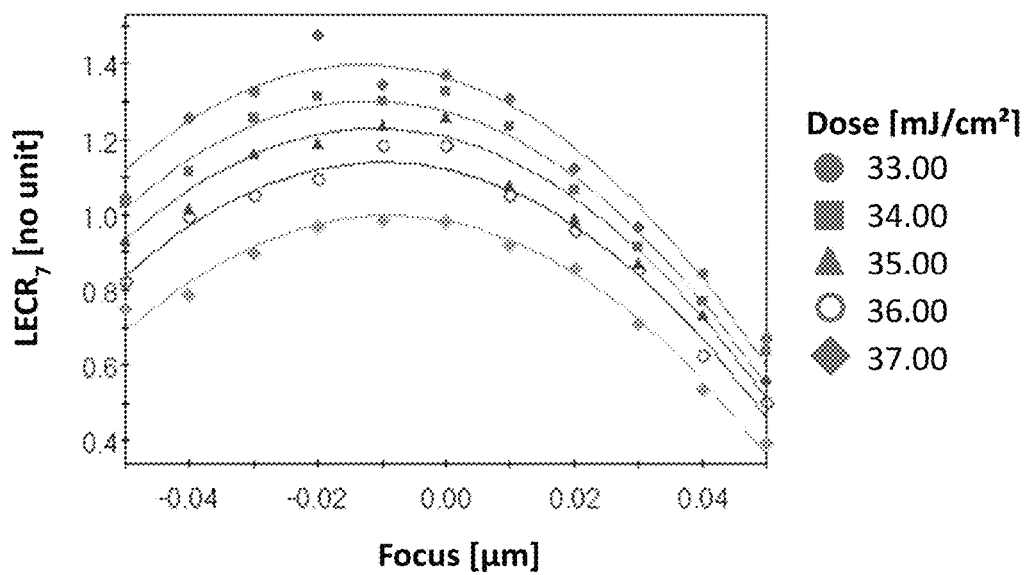
Figure 12C:
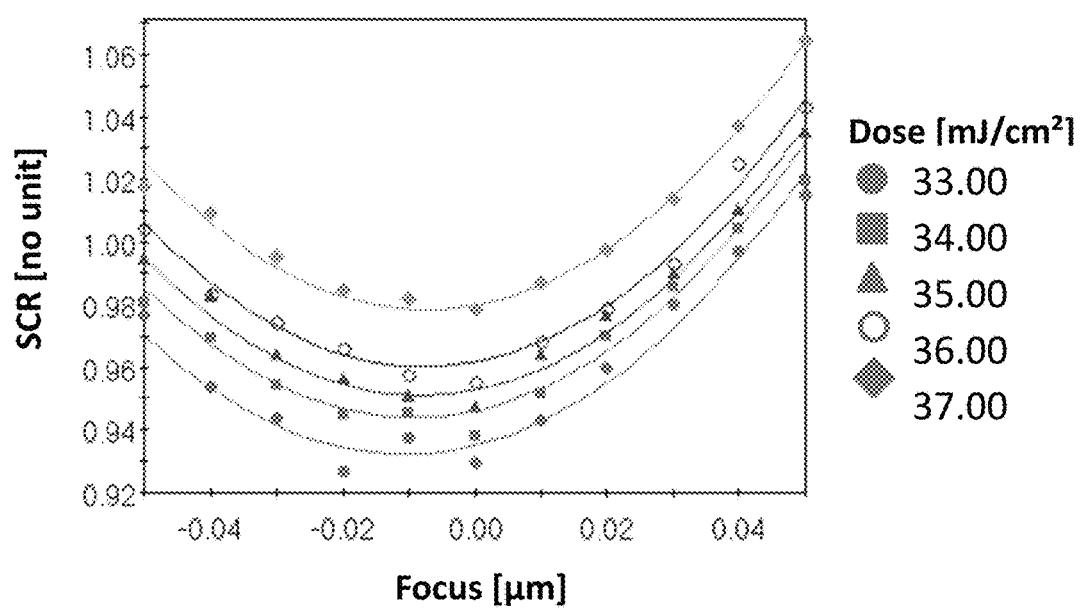

The parameters defined above can be used for determining a process window in the manner known in the art, by printing multiple patterns on a modulated focus/dose wafer and determining the parameters on each printed die. FIG. 12 shows Bossung plots for the parameters $LECR_1$, $LECR_7$ and SCR for a pair of neighbouring line-ends similar to the configuration of features 1 and 7 in the pattern of FIG. 1, taking into account the sectorizations as defined in FIGS. 5 and 9. It is immediately apparent that the measured values deviate less from the best fitting polynomial compared to conventional parameters. These parameters therefore allow a more accurate process window characterization. For a configuration similar to the line-ends of features 1 and 7, the combined evaluation of $LECR_1$, $LECR_7$ and SCR therefore provides a better basis for verifying an individual print and for determining a realistic process window.

Figure 13:
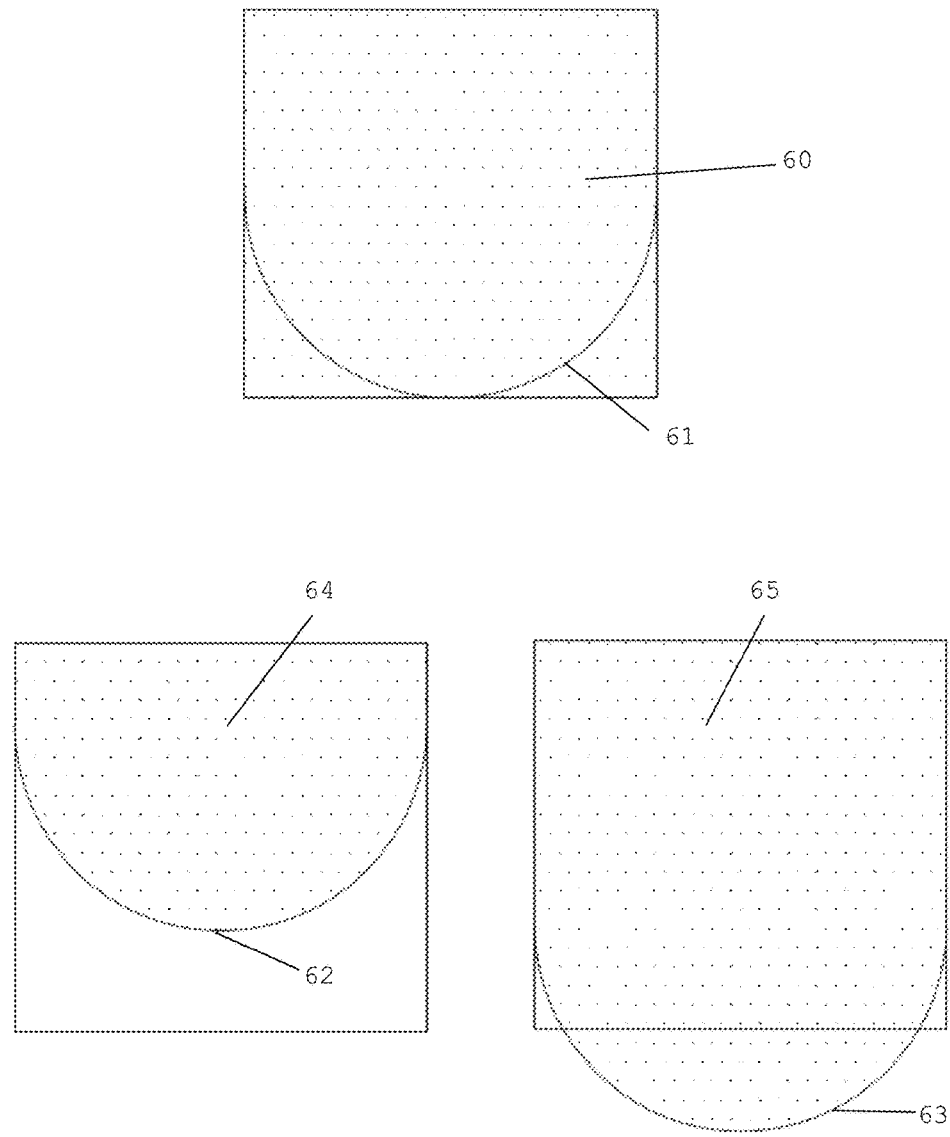
FIG. 13 illustrates a way in which to define a range for one of the parameters, the range being suitable for use in a process window characterization, according to an example embodiment.

For each type of sector-area based parameter, a range is defined within which the parameter must be situated in order to be regarded as acceptable, i.e. within the process window in terms of dose and focus. The range may be based on pre-defined shapes of the printed pattern. This is illustrated in FIG. 13 for the LECR parameter. A line-end sector 60 is shown. A half-circle shaped boundary 61 is drawn tangential to the boundary of sector 60. Shifted positions 62 and 63 of the half-circle are shown as well, obtained by shifting the half-circle 61 away from its tangential position in two opposite directions, optionally over the same pre-defined distance. Regarding the positions 62/63 as the outer boundaries of a printed pattern, corresponding LECR values can be calculated as:

lower LECR limit=surface area 64/surface area sector 60 higher LECR limit=surface area 65/surface area sector 60.

These limits define the LECR range for determining the process window for printing this line-end.

As stated above, the reference pattern may be the design intent pattern or it may be a contour obtained from a simulated pattern. A simulated pattern is produced for example in the course of the OPC design phase of a lithographic mask. This design phase is typically a process performed by using software tools suitable for the above-referenced OPC as known in the art, provided by EDA vendors. Such software tools are referred to within the context of the present description as 'software tools suitable for OPC' or 'OPC (software) tools.' For example, the simulation that yields the best approximation of the design intent can be used as the reference pattern. The sectorization, i.e. the definition of the sectors as such, of a simulated contour can either be done directly on the simulated contour, or it can be done first on the design intent as described above, after which the simulated reference contour is superimposed on the design intent and the sectors of the simulated contour are defined in the same manner as described above for the printed pattern. Superimposing the contour of the printed pattern on a simulated contour may take place with the help of the design intent: both contours are superimposed and optionally aligned to the design intent, resulting in the superposition of the printed and simulated contours. When a simulated pattern of a line pattern is applied as the reference pattern, the line-shaped features of the reference pattern are no longer polygon-shaped but will have the shape as defined by the simulation, which is itself an approximation of the polygon-shape of the design intent pattern.

The disclosure is not limited to the parameters LECR, CCR, LCR and SCR. Any parameter that is calculated as a function of the surface area of a sector, i.e. a sub-part of a pattern feature is suitable. The parameters need not be ratios calculated with respect to reference sectors. Ratios are convenient as they can be easily evaluated with respect to the value 1, or with respect to the lower and higher limits of the specified parameters.

Figure 14:
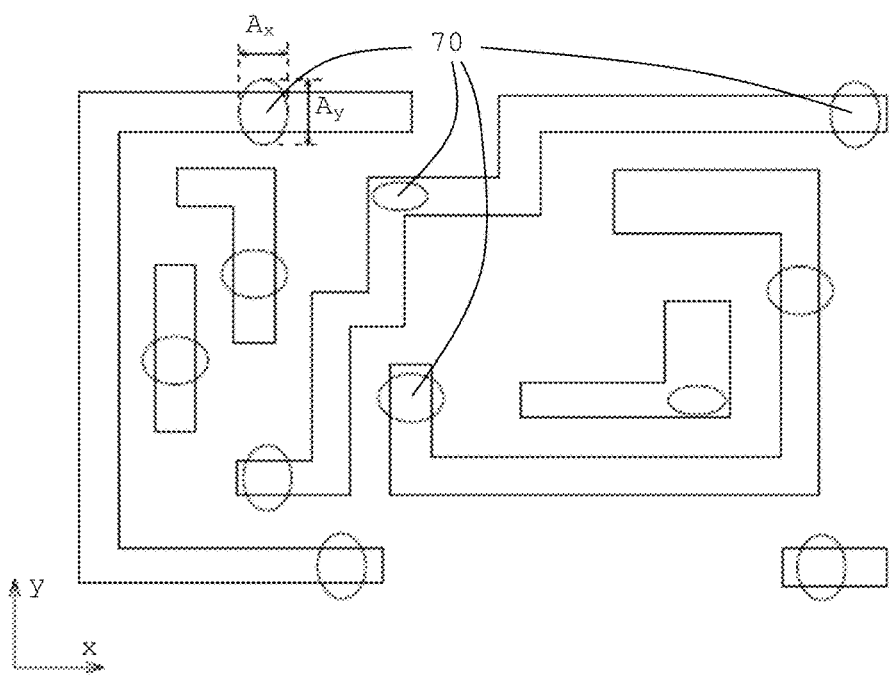
FIG. 14 illustrates the position of a number of via connections in relation to the exemplary pattern of FIG. 1, according to an example embodiment.

According to an embodiment, the definition of a number of the sectors in a reference pattern comprising line-shaped features aimed at producing metal lines in a level of an integrated circuit, is defined in relation to the position and the dimensions of via connections with respect to the features of the pattern. Via connections (in short 'vias') connect the line features of the pattern to line features of further patterns situated in levels above or below the level in which the pattern is located. Therefore, with respect to the design intent of a pattern comprising line features, the vias may be designed as having an ellipse-shaped cross section in the plane of the pattern, the ellipses overlapping the line features of the pattern at a number of locations. This is illustrated in FIG. 14 in relation to the same exemplary line pattern used previously. Instead of ellipse-shaped, vias may be designed to have any other cross-section, for example rectangular or circular.

In FIG. 14, the vias 70 are drawn on top of the design intent pattern. The as-designed dimensions of the vias are given by the length of the long and short axes of the ellipses, in relation to their orientation in an x-y orthogonal axis system: $A_x$ and $A_y$, as illustrated for one particular via connection in the pattern of FIG. 14. The positions of the vias shown in FIG. 14 are the positions as designed with respect to the pattern. The way in which line end sectors, line sectors and corner sectors may be defined on the basis of these via positions and dimensions, is illustrated in FIGS. 15a to 15c.

Figure 15A:
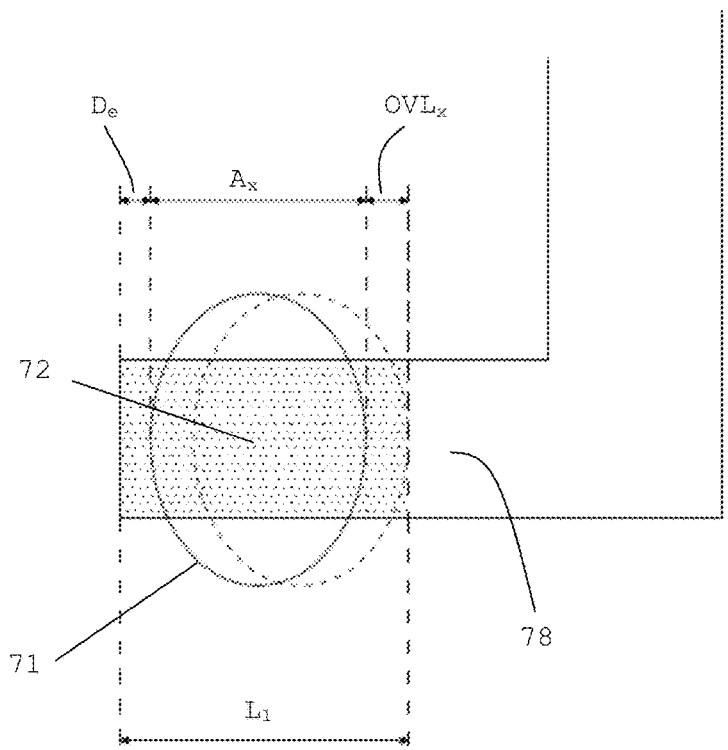
FIGS. 15a, 15b, and 15c illustrate a manner in which the position of via connections is used in the definition of sectors of a line pattern, according to an example embodiment.
Figure 15B:
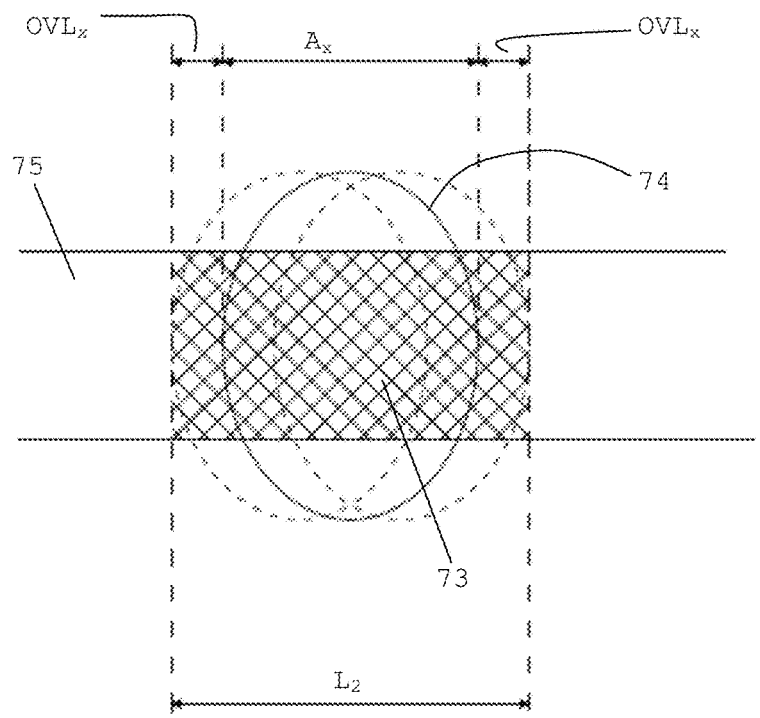
Figure 15C:
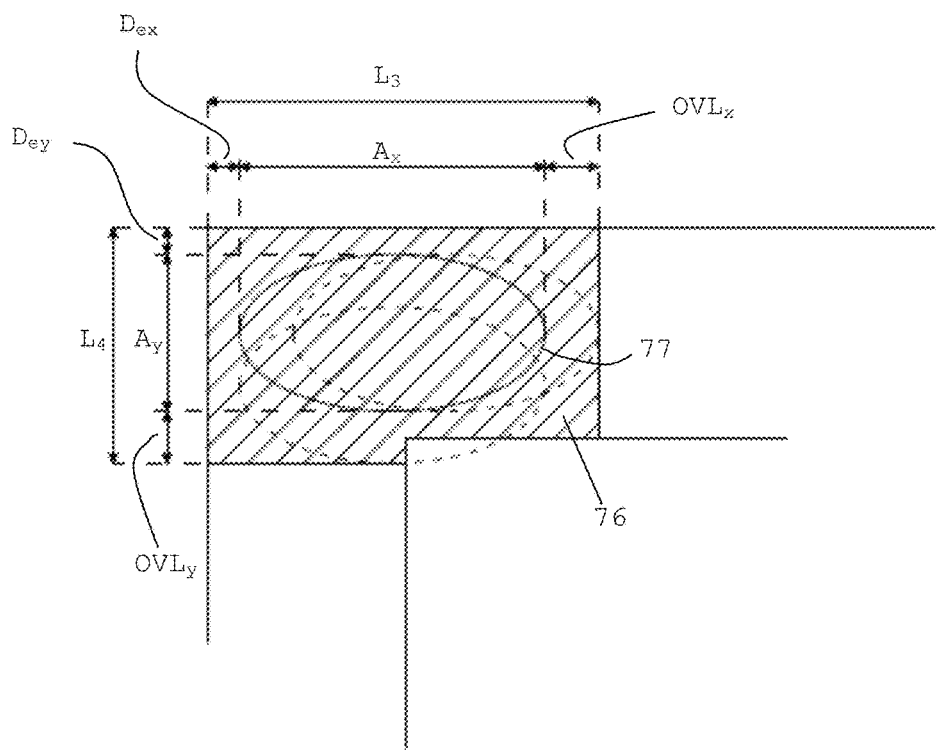

In FIG. 15a, a via 71 overlaps a line end area 78 of a feature, the line end area being oriented in the x-direction. The distance from the distal end of the line end area to the via is a given value $D_e$. The realization of the vias involves a lithography step following or preceding the lithography step applied for producing the line pattern. An overlay error may occur between the line pattern and the vias, due to a misalignment of the respective lithographic masks. Such an overlay error therefore causes the shifting of the actual via position with respect to the position as designed. This is illustrated by the shifted via drawn by the dotted line in FIG. 15a. According to the presently described embodiment, an estimation of the maximum overlay error OVLx in the x-direction is taken into account for defining the size of the line end sector, as illustrated in FIG. 15a. The length $L_1$ in the x-direction of the line-end sector 72 is determined by the formula:

$$L_1 = D_e + A_x + OVL_x \quad (1)$$

It is clear that the via may shift also in the y-direction, but this shift will not affect the size of this particular sector. Therefore only the overlay error in x-direction is illustrated in the drawing. Line end sectors oriented along the y-direction are of course defined taking into account the dimension $A_y$ and the overlay error $OVL_y$.

FIG. 15b shows the definition of a line sector 73 on the basis of a via 74 overlapping an x-oriented line feature 75 of the pattern. The overlay error $OVL_x$ is now taken into account in both opposite directions with respect to the as-designed position of the via. The length $L_2$ of the line sector is thereby defined as:

$$L_2 = A_x + 2 \cdot OVL_x \quad (2)$$

A line sector on a y-oriented line feature may be defined in an analogue manner by the formula: $A_y + 2 \cdot OVL_y$.

FIG. 15c shows the definition of a corner sector 76 on the basis of a via 77 overlapping a corner area of the pattern. The distances in x and y direction from the as-designed via 77 to the edges of the corner area are given by values $D_{ex}$ and $D_{ey}$ respectively. The overlay errors $OVL_x$ and $OVL_y$ are taken into account respectively in the x and y directions, leading to the following formulas for the lengths $L_3$ and $L_4$ of the corner sector in x and y direction:

$$L_3 = D_{ex} + A_x + OVL_x \quad (3)$$

$$L_4 = D_{ey} + A_y + OVL_y \quad (4)$$

The formulas (1) to (4) are in fact defining minimum values for the sector dimensions. Sector dimensions chosen larger than these values are equally acceptable in that they also take into account the via dimensions/position and the overlay error. Therefore the applicable formulas may be written more generally as:

$$L_1 \geq D_e + A_x + OVL_x \quad (1')$$

$$L_2 \geq A_x + 2 \cdot OVL_x \quad (2')$$

$$L_3 \geq D_{ex} + A_x + OVL_x \quad (3')$$

$$L_4 \geq D_{ey} + A_y + OVL_y \quad (4')$$

Sectorization of a line pattern for evaluating the SCR parameter as described above, can equally take into account possible vias which are overlapping one or each of the neighbouring sectors defined by drawing the polygons 40/43/46 in FIGS. 8-11. In this case, one or both of the two neighbouring sectors which overlaps with a via is first defined on the basis of one of the above formulas, i.e. taking into account the via's dimensions, position and the overlay error. After that, the polygon is drawn around the two neighbouring sectors so that at least the area of the previously defined sectors is included in the polygon, i.e. formulas (1') to (4') are satisfied for the sectors defined by drawing the polygon. Following this, the definition of the SCR parameter takes place in the same way as described above.

The above formulas (1) to (4) and (1') to (4') are examples of how the dimensions and the position of via connections, and an estimation of the maximum overlay error, can be used to define the size of the sectors in the sectorization of the reference pattern. This way of defining sectors ensures that the evaluation of these sectors on the basis of area-based parameters, such as LECR, CCR, LCR or SCR described above, takes into account the interaction between the sector and the overlapping via. In other words, this approach ensures that when a sector is regarded as being correctly printed on the basis of dose and focus settings being within a given process window determined on the basis of area-based parameters, the connection between the final metal line feature and the via is equally established correctly.

In the above examples, the reference pattern is the design intent pattern. The via dimensions and positions may be applied in an analogue way when defining sectors in the reference pattern when this reference pattern is a simulated pattern.

Instead of being the as-designed dimensions of the vias, the via-dimensions $A_x$ and $A_y$ applied in the above formulas could be based on simulations or experiments for determining the critical dimensions of the vias. In other words, the dimensions $A_x$ and $A_y$ in the above formulas may be dimensions of simulated vias or of actually produced vias. The distances $D_e$, $D_{ex}$, $D_{ey}$ are then adapted to the applied via dimensions.

Figure 16:
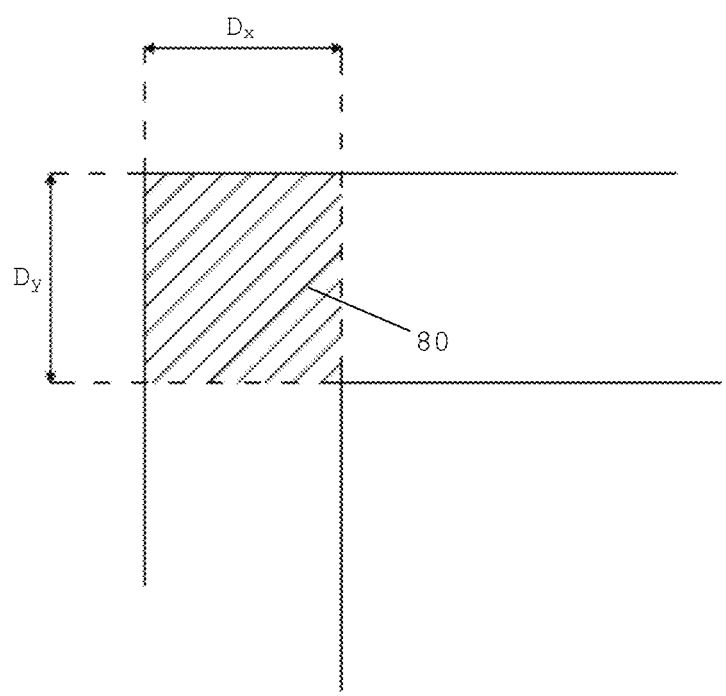
FIG. 16 illustrates how a corner sector may be defined in the absence of a via connection overlapping the corner, according to an example embodiment.

In an example embodiment, some or all areas of the pattern overlapping with a via connection are sectorized as described above, i.e. taking into account the dimensions, position and overlay error of the via connection. Other areas may be sectorized according to other criteria. According to an embodiment, a corner area that does not overlap with a via connection is sectorized on the basis of the corner area itself, as illustrated in FIG. 16. Dimensions $D_x$ and $D_y$ are directly derivable from the design intent pattern, and taken as the x and y length of the corner sector 80.

The parameters described above, taken as such, as well as the process window characterization using these parameters, are ultimately tools that are useful in the design, verification, and optimization of a lithographic mask. The evaluation of the sector-area-based parameters such as LECR, CCR, LCR and SCR obtained from a printed pattern and the process windows derived from it can be used as input for a further OPC optimization, by improving the mask design in certain hot spots revealed by the parameter evaluation. The disclosure is therefore equally related to methods for designing, verifying, and optimizing a lithographic mask, wherein the sector-surface-area based parameters as defined in the framework of the disclosure are implemented instead of other parameters being used today.

The sector-area-based parameters may equally be incorporated in an OPC tool as such, i.e. the tool is capable of determining these parameters on a simulated contour. This means that the parameters may be determined on simulated contours to evaluate the simulated contours with respect to the design intent and to determine simulated process windows. A direct comparison can then be made between 'measured' parameters and PWs and 'simulated' parameters and PWs, both determined in that case with respect to the same reference, and optionally with respect to the design intent.

When the OPC tool is capable of determining the sector-surface based parameters on a simulated contour, this means that the tool can equally be used to determine these parameters on the contour extracted from the printed pattern. The disclosure is specifically related to a method for designing a lithographic mask, wherein the OPC tool is used for this purpose.

While the present disclosure has been illustrated and described in detail in the drawings and foregoing description, such illustration and description are to be considered illustrative or exemplary and not restrictive. Other variations to the disclosed embodiments can be understood and effected by those skilled in the art in practicing the claimed method, from a study of the drawings, the disclosure and the appended claims. In the claims, the word "comprising" does not exclude other elements or steps, and the indefinite article "a" or "an" does not exclude a plurality. The mere fact that certain features are recited in mutually different dependent claims does not indicate that a combination of these measures cannot be used to advantage. Any reference signs in the claims should not be construed as limiting the scope.

The invention claimed is:

1. A method for verifying a printed pattern of features printed through a lithographic mask, the printed pattern approximating a reference pattern, the method comprising:
    defining sectors of at least a portion of the features in the reference pattern;
    producing a lithographic mask according to a mask design suitable for printing an intended pattern;
    printing a pattern through the lithographic mask;
    determining a contour of the printed pattern;
    superimposing the contour of the printed pattern on the reference pattern;
    determining surface areas of sectors of the printed pattern that correspond to the sectors of the reference pattern;
    calculating one or more parameters as a function of at least one of the surface areas, the parameters being related to a single sector or to multiple sectors, wherein one of the parameters is a ratio of the surface area of a sector of the printed pattern to a surface area of a corresponding sector of the reference pattern; and
    evaluating the parameters with respect to a reference value.

2. The method according to claim 1, wherein the reference pattern is a design intent pattern used for designing the lithographic mask.

3. The method according to claim 1, wherein the reference pattern is a contour of a simulated pattern.

4. The method according to claim 1, wherein the reference pattern comprises one or more line-shaped features, and wherein the line-shaped features are subdivided into sectors by defining line-end sectors, corner sectors and line sectors.

5. The method according to claim 1, wherein the sectors of the reference pattern and the corresponding sectors of the printed pattern are defined by defining one or more regions comprising two or more neighbouring sectors of features in the reference pattern and of the corresponding features in the printed pattern, and wherein for each of the defined regions the steps are performed of:
    determining the surface area R of the region;
    determining R-R', with R' the total surface area of the two or more neighbouring sectors of the printed pattern;
    determining R-R" with R" the total surface area of the two or more neighbouring sectors of the reference pattern; and
    calculating a ratio (R-R')/(R-R") as one of the parameters.

6. The method according to claim 1, wherein the one or more parameters are determined on a plurality of versions of the printed pattern, the versions being printed in a lithographic tool wherein a focus and/or a dose is varied in the plurality of versions, and wherein one or more process windows are determined from the values of the parameters.

7. A method for verifying a printed pattern of features printed through a lithographic mask, the printed pattern approximating a reference pattern, the method comprising:
    defining sectors of at least a portion of the features in the reference pattern;
    producing a lithographic mask according to a mask design suitable for printing an intended pattern;

printing a pattern through the lithographic mask;
determining a contour of the printed pattern;
superimposing the contour of the printed pattern on the reference pattern;
determining surface areas of sectors of the printed pattern that correspond to the sectors of the reference pattern;
calculating one or more parameters as a function of at least one of the surface areas, the parameters being related to a single sector or to multiple sectors; and
evaluating the parameters with respect to a reference value,
wherein the reference pattern comprises one or more line-shaped features, and wherein the line-shaped features are subdivided into sectors by defining line-end sectors, corner sectors and line sectors,
wherein the line-shaped features are designed for producing a pattern of metal lines in a level of an integrated circuit, with via connections above and/or below the pattern, the via connections overlapping a line-end, a line or a corner of the pattern, and wherein the definition of at least some of the line-end sectors, line sectors and corner sectors takes into account the dimensions and position of via connections overlapping the sectors, as well as an overlay error between the metal line pattern and the via connections.

8. The method according to claim 7, wherein the length L of a line-end sector is defined by the following condition:

$$L \geq De + A + OVL,$$

wherein De is the distance between the distal end of the line end sector and an overlapping via connection, A is the dimension of the via in the longitudinal direction of the line end sector, and OVL is the maximum overlay error in the longitudinal direction of the line end sector.

9. The method according to claim 7, wherein the length L of a line sector is defined by the following condition:

$$L \geq A + 2 \cdot OVL$$

wherein A is the dimension of an overlapping via in the longitudinal direction of the line sector and OVL is the maximum overlay error in the longitudinal direction of the line sector.

10. The method according to claim 7, wherein dimensions Lx and Ly of a corner sector in two orthogonal directions are defined by the following conditions:

$$Lx \geq Dex + Ax + OVLx$$

$$Ly \geq Dey + Ay + OVLy$$

wherein Dex and Dey are the distances between an overlapping via connection and the edges of the corner sector in the two orthogonal directions, Ax and Ay are the dimensions of the via connection in the two orthogonal directions, and OVLx and OVLy are the maximum overlay errors in the two orthogonal directions.

11. A method for designing a lithographic mask, comprising:
providing an intended pattern comprising a plurality of structural features;
producing a mask design of a lithographic mask suitable for printing the intended pattern, and one or more simulated patterns printed through the mask design;
producing a lithographic mask according to the mask design;
printing a pattern through the lithographic mask; and
performing a verification of the printed pattern,
wherein the verification comprises:
    defining sectors of at least a portion of the features in a reference pattern, with the intended pattern or one of the simulated patterns serving as the reference pattern;
    determining a contour of the printed pattern;
    superimposing the contour of the printed pattern on the reference pattern;
    determining surface areas of sectors of the printed pattern that correspond to the sectors of the reference pattern;
    calculating one or more parameters as a function of at least one of the surface areas, the parameters being related to a single sector or to multiple sectors; and
    evaluating the parameters with respect to a reference value.

12. The method according to claim 11, further comprising:
updating the mask design on the basis of the verification;
producing a second lithographic mask according to the updated mask design;
printing a pattern through the second mask; and
performing a further verification on the pattern printed through the second mask,
wherein the preceding steps are repeated until a lithographic mask is produced that answers to a pre-defined set of requirements in terms of a difference between the printed pattern and a reference pattern.

13. The method according to claim 11, wherein producing a mask design suitable for printing the intended pattern and producing one or more simulations of the printed pattern is performed by using a software tool for optical proximity correction.

14. The method according to claim 13, wherein the step of determining, on the contours obtained from the printed pattern, the value of one or more of the parameters, is performed by using the OPC software tool for verifying the contours.

* * * * *